March 12, 1935.　　　E. B. SARGENT　　　1,994,113
CONDUIT SYSTEM
Filed March 9, 1932　　　2 Sheets-Sheet 2
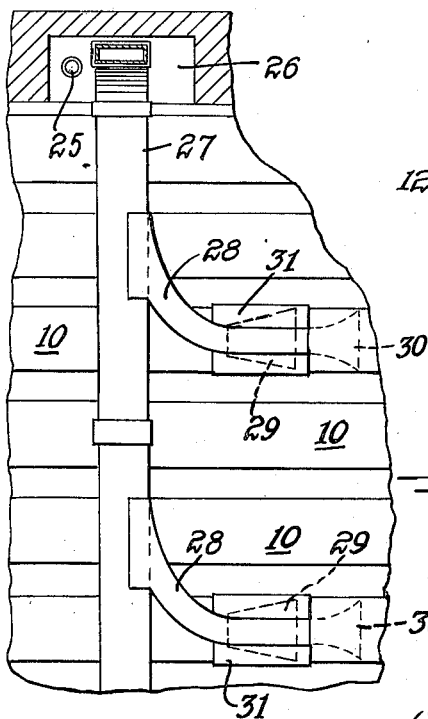
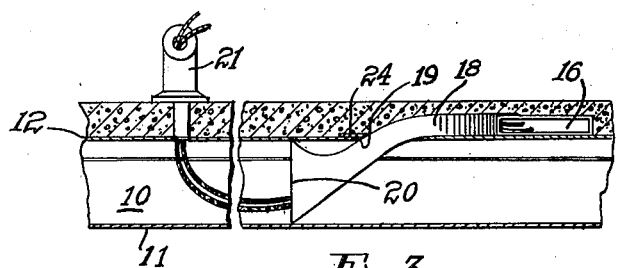
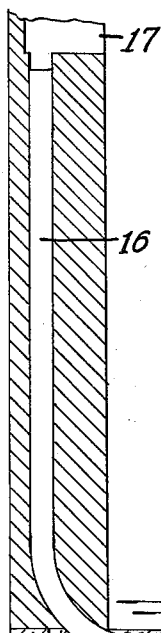
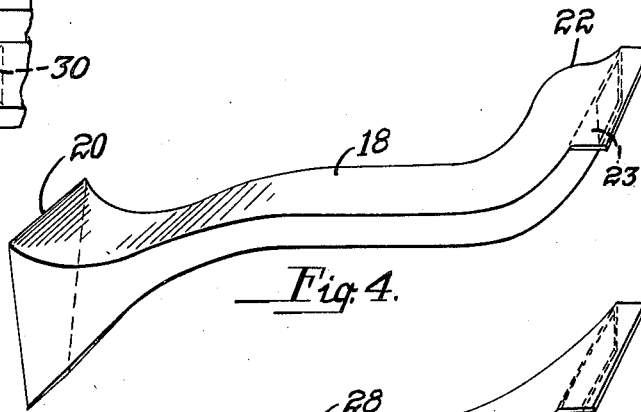
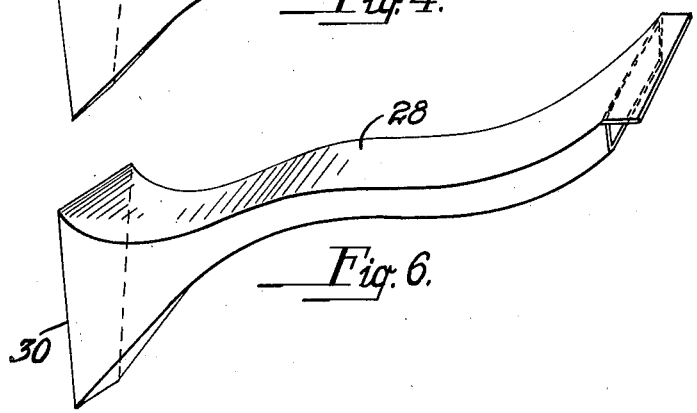
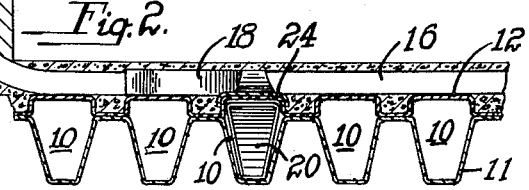
INVENTOR.
Edward B. Sargent
BY Green & McCallister
His ATTORNEYS Patented Mar. 12, 1935

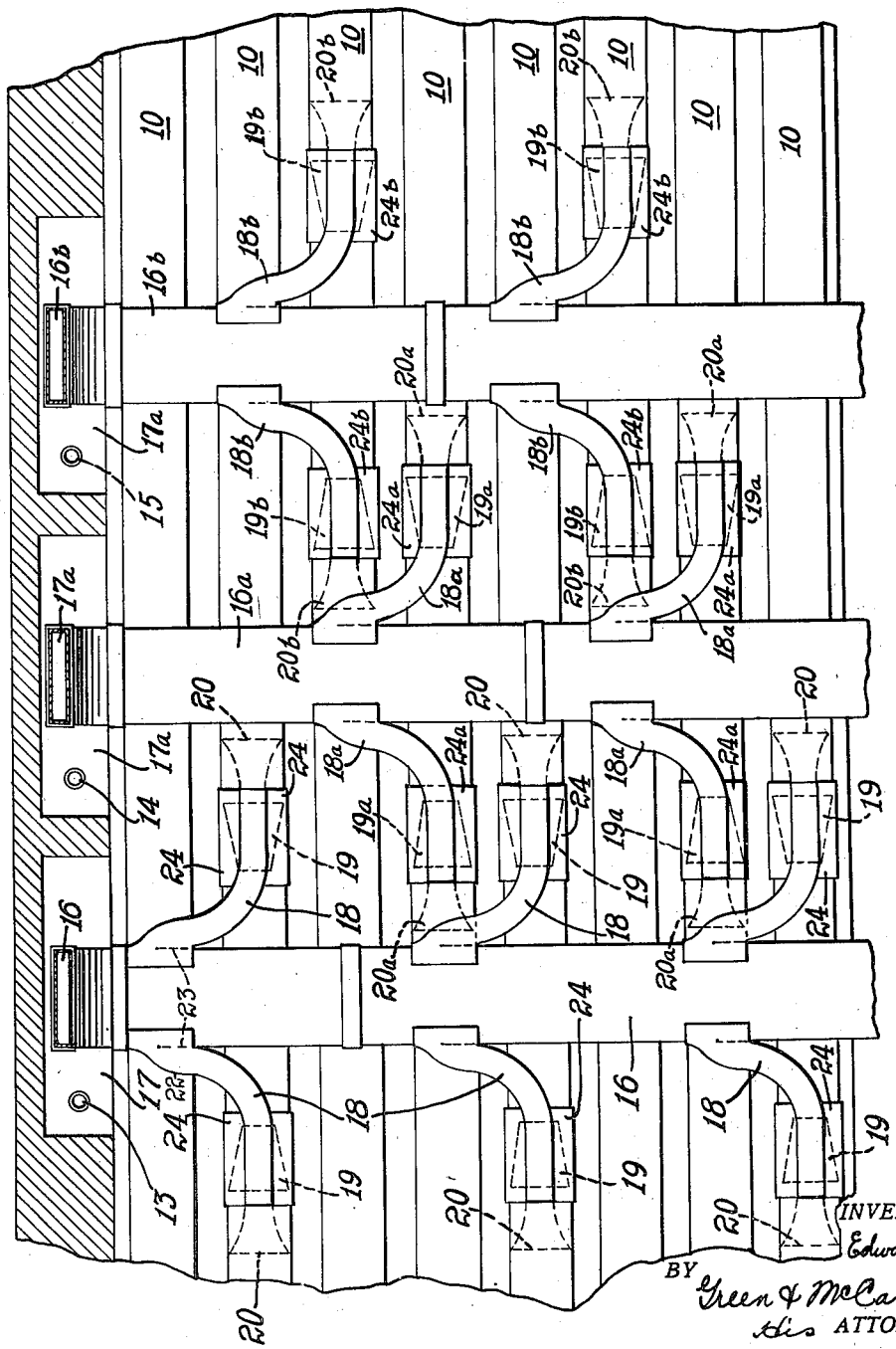

1,994,113

UNITED STATES PATENT OFFICE 1,994,113

CONDUIT SYSTEM

Edward B. Sargent, Mount Lebanon, Pa., assignor, by mesne assignments, to H. H. Robertson Company, Pittsburgh, Pa., a corporation Application March 9, 1932, Serial No. 597,664

9 Claims. (Cl. 247—3)

This invention relates to systems of electrical wiring of the type adapted to be concealed within the floor of the building during the course of construction thereof, and more particularly to a conduit system for a building having the base floor constructed of a series of closely spaced hollow beams.

One object of this invention is to provide a wiring conduit system for the floors of a building whereby flexibility of electrical service is obtained.

Another object of this invention is to provide a conduit system for buildings having hollow beam sub-floors whereby electrical service outlets may be readily established at any desired point in the floor for any type of service.

A further object is to provide a conduit system for buildings having a hollow beam sub-floor and having novel means for establishing communication between the hollow beams of the floor and the conduit.

A still further object is to provide an electrical conduit system for floors of the hollow beam type which is much easier and cheaper to install than the highly complex conduit systems with their expensive floor boxes now being used.

A still further object is to provide a conduit system which is relatively cheap to manufacture and which may be wholly or partially fabricated at the factory.

These and other objects which are readily apparent to those skilled in this particular art are embraced by means of this invention, one embodiment of which is described in the following specification and illustrated in the accompanying drawings, wherein:

Figure 1 is a top plan view of a section of a floor of hollow beam construction provided with my improved conduit system and illustrating the accessibility to the beams;

Fig. 2 is a partial view in transverse section of a hollow beam floor provided with my conduit system;

Fig. 3 is a partial view in longitudinal section of a hollow beam equipped with my improved fixture and showing an electrical service outlet connected to the beam;

Fig. 4 is a view in perspective of the fixture leading from the beam to the conduit;

Fig. 5 is a top plan view of a hollow beam floor section provided with a modified form of electrical service conduit, and ;

Fig. 6 is an enlarged view in perspective of the fixture used with the conduit shown in Figure 5.

In general my invention resides in a conduit for delivering electrical service to the base or sub-floor of a building formed of metallic hollow beams spaced closely together and end to end and forming continuous passages through the floor. The conduit through which the electrical conductors are fed extends transversely across the hollow beams and has a series of hollow arms leading therefrom which extends into the passage in each of the hollow beams so as to establish communication between the conduit and beams.

These hollow arms may be formed integrally with the conduit or may be attached thereto in any suitable way such as spot welding or the like, and may be so spaced along one or both sides of the conduit that they extend into each of the hollow beams or into any of the beams desired to be made available for electrical service. The spacing of the arms depends of course upon the number of different types of electrical service being supplied in the building.

These arms are in the form of a reverse or ogee curve and each terminates within the beam in a flared or bell mouth which is preferably of the same shape as the shape of the beam in cross-section and of a size substantially the same as the passage in the beam so that the bell mouth substantially fills the same. It is understood, however, that the end of the arm may be of any desired shape or size without departing from the spirit of my invention.

In Figs. 1 and 2, I have illustrated my conduit system as applied in a building having a metallic hollow beam base or sub-floor of the type disclosed by James H. Young in a copending application, Serial No. 524,813. Metallic floors of the type disclosed in that application are formed of metal sheets corrugated to form a series of closely spaced hollow beams 10. These floors are formed in sections and each section comprises a lower corrugated sheet 11 and an upper sheet 12 which may either be corrugated or flat. The sheets 11 and 12 are so corrugated that the centers of the hollow beams 10 in each section will be spaced approximately six inches apart. In installing the floor, the sections are so arranged that the hollow beams in one section are in alinement with the hollow beams in the next section and form a series of continuous passageways in the sub-floor through which electrical conductors may be drawn.

As is customary in building construction the electrical conductors are led to each floor through a shaft provided for the purpose, or in any other suitable manner, and each type of electrical service is segregated from the other types.

In Figure 1, 13 represents a riser through which the conductor for one type of service, such as high tension service for lights, fans, etc., are led to the floor. 14 represents a riser for another type of service, such as low tension service for buzzers or the like, and 15 represents a riser for another type of service, such as telephone, telegraph, or the like.

In order to make each of the hollow beams 10 accessible to one or another of the various types of electrical service for which the building is wired, I provide conduits 16, 16a, and 16b which lead from panel boxes 17, 17a, and 17b connected to the risers 13, 14, 15, respectively, and extend transversely across the hollow beams 10. Each of these conduits 16, 16a, and 16b have a series of hollow arms 18, 18a, and 18b, respectively, leading therefrom on opposite sides thereof which extend through openings 19, 19a, and 19b cut in the tops of hollow beams 10. These arms 18, 18a, and 18b each have a reverse or ogee curve therein and curve away from the conduit in the same horizontal plane therewith and then curve downwardly through the openings in the beams and terminate in flared out or bell mouth portions 20, 20a, and 20b of substantially the same shape as the cross-sectional shape of the hollow beams 10 and of substantially the same size.

By making the bell mouths 20, 20a, and 20b of substantially the same size and shape as the cross-sectional shape and size of the hollow beams 10, it is readily apparent that these bell mouths completely close the hollow beams and direct the conductors being fed into the beams in the proper direction. It is also apparent that the hollow arms 18, 18a, and 18b present rounded corners around which the conductor may be readily drawn without injury to them.

In order to secure a high degree of flexibility so that access to any desired type of service may be had at any desired portion of the floor, the arms 18, 18a, and 18b, which may be integral with or attached to the conduit, are so spaced along the conduits 16, 16a, and 16b that the arms 18 extend into one of the hollow beams, the arms 18a extend into the next beam, and the arms 18b into the third beam, at which time the cycle is repeated. Assuming that the hollow beams 10 are on approximately six inch centers, it is readily apparent that with my conduit system an outlet for any type of electrical service may be obtained within nine inches of the exact spot on the floor desired.

When it is desired to establish a floor outlet such as a plug for an adding machine or the like device, using high tension service, the finish floor is cut away over the nearest beam to the desired location having access to the conduit 16. Markers are, of course, provided which extend through the finish floor and designate the type of service capable of being led through the beams. An opening is then drilled in the beam and a fishing wire is inserted through the opening and forced through the arm 18 into the conduit 16 where it is led into the panel box 17. Wires are then drawn through the beam, arm, and conduit, and are suitably connected to the conductors in the riser 13. The opposite ends of the wire extend through the opening cut in the beam and are secured to an outlet fixture 21 (Fig. 3) of any suitable type.

In order to prevent the fishing wire from entering the hollow arm 18 on the opposite side of the conduit 16, each of the arms has a relatively sharp curved portion 22 so that it enters the conduit at a relatively small acute angle and has a portion 23 extending a short distance across the open end thereof which partially closes the arm and directs the fishing wire into the conduit so that it will travel toward the panel box 17.

The openings 19, 19a, and 19b may be covered with slotted plates 24, 24a, and 24b, or other suitable members, which are welded or otherwise suitably secured to the beam, to prevent the finish flooring surface from passing into the beams 10 and for restoring the original strength to the beams.

In Figs. 5 and 6 I have illustrated a modified form of conduit system in which the hollow arms are spaced along the length of the conduit and are led from one side thereof. In this modification, 25 represents the riser leading the conductors to a panel box 26, from which they are led across the floor through a conduit 27 extending transversely of the floor beams 10. The conduit 27 has a series of hollow arms 28 formed integral with one side thereof which curve gradually from the conduit and extend into the hollow beam 10 through openings 29 formed in the top thereof. The ends of these hollow arms within the hollow beams terminate in flared or bell-like mouth portions 30 of substantially the same shape as the cross-sectional shape of the beam and are of such a size that they completely close the passageway through the beam. As in the previous embodiment, the openings 29 may be covered with suitable plates 31 to prevent the finish flooring material from falling into the beams and clogging the same.

Since the flared end of the hollow arms completely close the beams 10, it is apparent that wires may be drawn into the beam from one direction only. Therefore, if the opposite side of the beam is to be used, it is necessary with the modification in Figs. 5 and 6 to place a second conduit similar to the conduit 27 across the beams adjacent to the first conduit and having the hollow arms entering the beams extending in the opposite direction from the conduit than do the arms on the conduit 27.

It is also apparent that conduits having all the arms extending from one side of the conduit may be arranged so as to permit different types of electrical service to be delivered to the various beams of the floor by providing a conduit or pair of conduits similar to the conduit 27 for the riser of each type of electrical service.

My improved conduits with their hollow arms are adapted to be installed as soon as the metallic sub-floor has been laid, after which it is covered with the finish floor so that it is completely concealed from view. Each of the beams is provided with a suitable marker which extends through the finish floor and not only marks the location of the beam but also designates the type of service for which each beam may be used.

It is apparent from the foregoing description that I have provided means for wiring a building having different types of electrical service which is highly flexible since an outlet may be secured at practically any point in the floor service, simple to install and which is much cheaper than the highly complex systems now being used extensively wherein a large number of conduits extending in all directions are placed on the sub-floor and have complicated and expensive outlet boxes situated at various points in the floor to permit access to the conduits. These systems also greatly increase the depth of the finish floor and add considerable to the cost of the floor.

While I have illustrated the different types of electrical supply as being brought to a panel box through a suitable riser located in the wall of the building, it is to be understood that the electrical supply may be brought to the floor in any suitable manner and that my conduit system may end in any suitable type of terminal, such as a shaft, where it is possible to make electrical connections, as well as the wall panel illustrated.

It is also understood that while I have illustrated a conduit having a series of hollow arms, each of which has a reverse curve, the shape and construction of the arms may be varied to meet the requirements of a particular construction and further, while my conduit system is illustrated in connection with a certain type of sub-floor, my invention is not limited thereto but may be applied to any sub-floor of hollow beam construction.

It is to be understood that certain modifications, additions, subtractions, or omissions may be made herein without departing from the spirit of my invention or the scope of the appended claims.

What I claim as new and desire to secure by Letters Patent is:

1. A concealed wiring system for buildings and the like having a metallic base floor provided with a series of closely spaced passageways comprising an electrical wiring outlet box, a duct leading from said box and extending across said floor passageways, and curved hollow arms having one end secured to said duct exterior to said passageways and having their other ends extending downwardly through openings in said floor conduits for making any portion of said floor accessible to said outlet box.

2. A wiring conduit for buildings having a hollow beam floor construction comprising a conduit having a series of hollow arms extending therefrom at spaced intervals along its length, each of said arms being curved adjacent the conduit and terminating at their ends within the conduit in a flared bell mouth of substantially the same shape as the cross-sectional shape of said beams.

3. The combination with a multicellular floor, of a main wiring conduit extended transversely of the cells in said floor, and a hollow branch conduit member connected with said main conduit exterior to said cells and extended into a cell of said floor and provided with an inlet mouth of substantially the cross sectional area of the said cell, to enable a conductor led into the said cell in front of said inlet mouth to be drawn out of the cell through said hollow conducting member into the main wiring conduit and thence out of the latter.

4. The combination with a multicellular floor having a plurality of substantially parallel cells, of a main wiring conduit extended transversely of the cells in the said floor, and a hollow branch conduit member connected at one end with the main wiring conduit exterior to said cells and having its other end extended into a cell of said floor, said hollow branch conduit member having its end within said cell of substantially the cross sectional area of the cell to provide a substantially unobstructed passage from the cell running in one direction into the main wiring conduit running substantially at right angles to said cell.

5. The combination with a multicellular floor having substantially parallel cells, of a main wiring conduit extended transversely of the cells in said floor, and a hollow branch conduit having one end extended into a cell in said floor and provided with a mouth of substantially the cross sectional area of said cell, and having its other end outside of the cell and connected with the main wiring conduit.

6. The combination with a multicellular floor having substantially parallel cells, of a main wiring conduit extended transversely of the cells in said floor, and a hollow branch conduit connecting said main wiring conduit with a cell of said floor, said branch conduit having a portion thereof extended into said cell to near the bottom wall of said cell and inclined upwardly to the portion of the branch conduit outside of said cell.

7. The combination with a multicellular floor having a wiring outlet and a conduit outlet, of a main wiring conduit extended transversely of a cell in said floor, and a branch conduit extended into said cell through the conduit outlet therein and having a portion thereof outside of said cell curved in the direction of the length of said main wiring conduit and connected therewith to facilitate the movement of a wire out of the cell and into the conduit.

8. The combination with a multicellular floor, of a main wiring conduit external to the cells of said floor, and a branch conduit connecting a cell of said floor with the main wiring conduit, said branch conduit having a portion exterior to said cell connected with the main wiring conduit and having a portion within the cell provided with a mouth of substantially the cross sectional area of the cell.

9. The combination with a multicellular floor, of a main wiring conduit external to the cells of said floor, and a branch conduit member having one end external to said main wiring conduit and communicating with the interior thereof, and having its other end extended into a cell of said floor and provided with means for facilitating the movement of a wire out of the cell and into the wiring conduit.

EDWARD B. SARGENT.